(No Model.)
J. H. SCHAAL & S. V. HARBAUGH.
Fish Scaler.
No. 242,056.          Patented May 24, 1881.
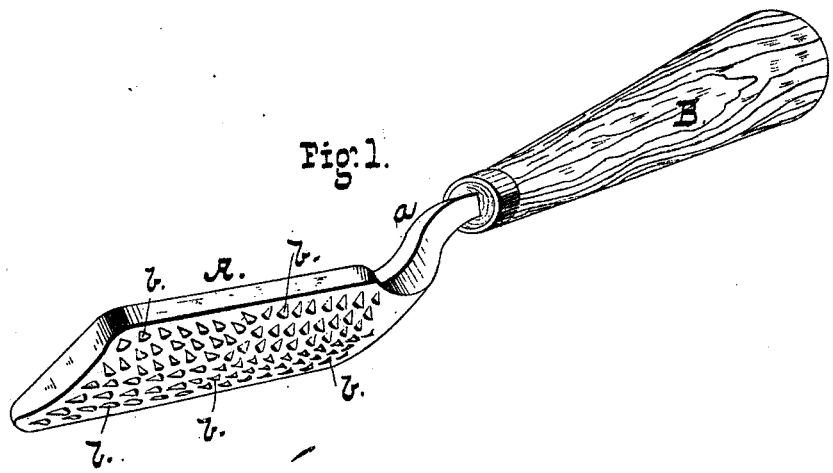
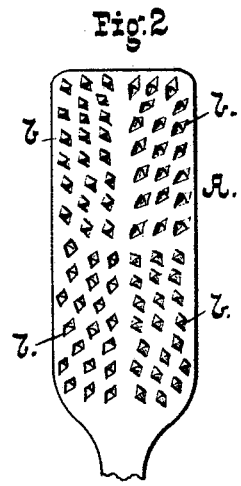
WITNESSES.
W. A. Butram
E. J. Shoff
INVENTORS
John H. Schaal.
Saml. V. Harbaugh.
BY
R. D. Williams
ATTORNEY.

UNITED STATES PATENT OFFICE.

JOHN H. SCHAAL AND SAMUEL V. HARBAUGH, OF BALTIMORE, MARYLAND, ASSIGNORS TO THE UNION FILE WORKS, OF SAME PLACE.

FISH-SCALER.

SPECIFICATION forming part of Letters Patent No. 242,056, dated May 24, 1881.

Application filed April 28, 1881. (No model.)

*To all whom it may concern:*

Be it known that we, JOHN H. SCHAAL and SAMUEL V. HARBAUGH, of Baltimore city, State of Maryland, have invented certain new and useful Improvements in Fish-Scalers; and we hereby declare the same to be fully, clearly, and exactly described as follows, reference being had to the accompanying drawings, in which—

Figure 1 is a perspective view of the device, and Fig. 2 is a bottom plan of the blade.

Our invention relates to devices for scaling fish; and it consists in a blade or plate provided with a suitable handle and having its face roughened by punching up a series of teeth, and adapted for operation, as hereinafter set forth.

In the drawings, A is a plate or blade having a convex lower face, as shown, on which is formed a series of teeth, $b$. The shank $a$ of the plate A is bent upward and fitted into a suitable handle, B. The teeth are formed by punching the metal, before tempering, with a sharp instrument designed to gouge into the plate and raise the metal in front of it. The face of the plate is divided into sections, in each of which the teeth point toward the center of the plate, as shown.

In operation the fish is held by the gills or tail and the plate is moved back and forth over the scales, removing them without scratching or tearing the skin of the fish. The object of causing the teeth to point toward the center of the plate is to utilize both forward and backward strokes of the plate to remove the scales from the irregular surface of the fish and obviate the necessity for constantly changing its position as the scaling proceeds.

The meeting edge of the walls and back of the plate is made quite sharp, and may be used to remove the scales close behind the fins.

Having thus described our invention, what we claim is—

The fish-scaler herein described, consisting of the plate A, having shank $a$ and handle B, and provided with punched-up teeth $b$ on its face, as and for the purpose set forth.

JOHN H. SCHAAL.
SAM. V. HARBAUGH.

Witnesses:
R. D. WILLIAMS,
GEO. H. PISTEL.